(12) United States Patent
Krawczyk et al.

(10) Patent No.: US 7,560,223 B2
(45) Date of Patent: *Jul. 14, 2009

(54) FLUID EJECTION DEVICE STRUCTURES AND METHODS THEREFOR

(75) Inventors: John W. Krawczyk, Richmond, KY (US); Andrew L. McNees, Lexington, KY (US); James M. Mrvos, Lexington, KY (US); David L. Bernard, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 866 days.

This patent is subject to a terminal disclaimer.

(21) Appl. No.: 11/026,353

(22) Filed: Dec. 30, 2004

(65) Prior Publication Data

US 2006/0054592 A1 Mar. 16, 2006

Related U.S. Application Data

(63) Continuation-in-part of application No. 10/938,009, filed on Sep. 10, 2004.

(51) Int. Cl.
*B41J 2/16* (2006.01)

(52) U.S. Cl. ........................................ 430/320; 216/27
(58) Field of Classification Search .................. None
See application file for complete search history.

(56) References Cited

U.S. PATENT DOCUMENTS

| | | | |
|---|---|---|---|
| 6,409,312 B1 * | 6/2002 | Mrvos et al. | 347/54 |
| 6,555,480 B2 | 4/2003 | Milligan et al. | |
| 2003/0034326 A1 * | 2/2003 | Watanabe et al. | 216/27 |
| 2003/0038108 A1 * | 2/2003 | Koyama et al. | 216/27 |

* cited by examiner

*Primary Examiner*—John A. McPherson
(74) *Attorney, Agent, or Firm*—Dinsmore & Shohl, LLP

(57) ABSTRACT

Methods of forming a fluid channel in a semiconductor substrate may include providing a semiconductor substrate having a backside and a device side, wherein the device side is configured to secure ink ejecting devices thereon and applying a material layer to the backside of the semiconductor substrate. The method may further include providing a gray scale mask configured with a pattern corresponding to a fluid channel having a plurality of slots, exposing the material layer to sufficient light radiation energy through the gray scale mask and etching the exposed material layer and the semiconductor substrate through to the device side of the semiconductor substrate.

31 Claims, 17 Drawing Sheets

FLUID EJECTION DEVICE STRUCTURES AND METHODS THEREFOR

This application is a continuation-in-part of U.S. patent application Ser. No. 10/938,009, entitled "Methods of Deep Reactive Ion Etching", filed on Sep. 10, 2004, the entire disclosure of which is hereby incorporated by reference. This application is also filed concurrently with a corresponding and co-owned U.S. patent application entitled "Fluid Ejection Device Structures And Methods Therefor", Ser. No. 11/026,839.

FIELD OF THE INVENTION

The invention relates to fluid ejection device structures, and in particular to methods of forming fluid channels in semiconductor substrates.

BACKGROUND OF THE INVENTION

Ink jet printers continue to be improved as the technology for making the printheads continues to advance. New techniques are constantly being developed to provide low cost, highly reliable printers which approach the speed and quality of laser printers. An added benefit of ink jet printers is that color images can be produced at a fraction of the cost of laser printers with as good or better print quality than laser printers. All of the foregoing benefits exhibited by ink jet printers have also increased the competitiveness of suppliers to provide comparable printers in a more cost efficient manner than their competitors.

One area of improvement in the printers is in the print engine or printhead itself. This seemingly simple device is a relatively complicated structure containing electrical circuits, fluid channels and a variety of intricate, diminutive parts assembled with precision to provide a powerful, yet versatile ink jet pen. The primary components of the ink jet printhead are a semiconductor chip or substrate, a nozzle plate and a flexible circuit attached to the substrate. The semiconductor substrate is typically made of silicon and contains various passivation layers, conductive metal layers, resistive layers, insulative layers and protective layers deposited on a device side thereof (e.g., the side configured to secure ink ejecting devices thereon such as resistors and nozzle plates). The semiconductor substrate may comprise one or more ink passageways or fluid channels having specific geometries to control the characteristics of fluid flow (e.g., ink) to the nozzle plate. More particularly, because different systems or fluids require different channel dimensions and delivery angles to properly deliver the ink to the nozzle plate, fluid channels having specific geometries in the semiconductor substrate are desirable. However, the multiple steps associated with forming such fluid channels create issues.

Accordingly, there continues to be a need for fluid channels with specific geometries and improved processes for making the same.

SUMMARY OF THE INVENTION

Accordingly, the present invention is intended to address and obviate problems and shortcomings and otherwise improve previous methods for forming fluid channels.

To achieve the foregoing, one exemplary embodiment of the present invention is a method of forming a fluid channel in a semiconductor substrate. The method comprises applying a material layer to a side of the semiconductor substrate. The method further comprises providing a gray scale mask configured with a pattern corresponding to a fluid channel, exposing the material layer to sufficient light radiation energy through the gray scale mask and etching the patterned material layer and the semiconductor substrate.

Another exemplary embodiment of the present invention is a method of forming a fluid channel in a semiconductor substrate. The method comprises applying a material layer to a first side of a semiconductor substrate. The method further comprises providing a gray scale mask configured with a pattern corresponding to a fluid channel having a plurality of slots, exposing the material layer to sufficient light radiation energy through the gray scale mask and etching the exposed material layer and the semiconductor substrate through to a second side of the semiconductor substrate.

Yet another exemplary embodiment of the present invention is a method for forming a printhead for an ink jet printer. The method comprises applying a material layer to a side of a semiconductor substrate. The method further comprises providing a gray scale mask configured with a pattern corresponding to a fluid channel, exposing the material layer to sufficient light radiation energy through the gray scale mask and etching the exposed material layer and the semiconductor substrate. The semiconductor substrate may be attached to a nozzle plate, an electrical circuit and a printhead body to form an ink jet printhead.

The present methods are advantageous for providing a fluid channel in a semiconductor substrate, particularly in the manufacture of an ink jet printhead.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

Figure 1:
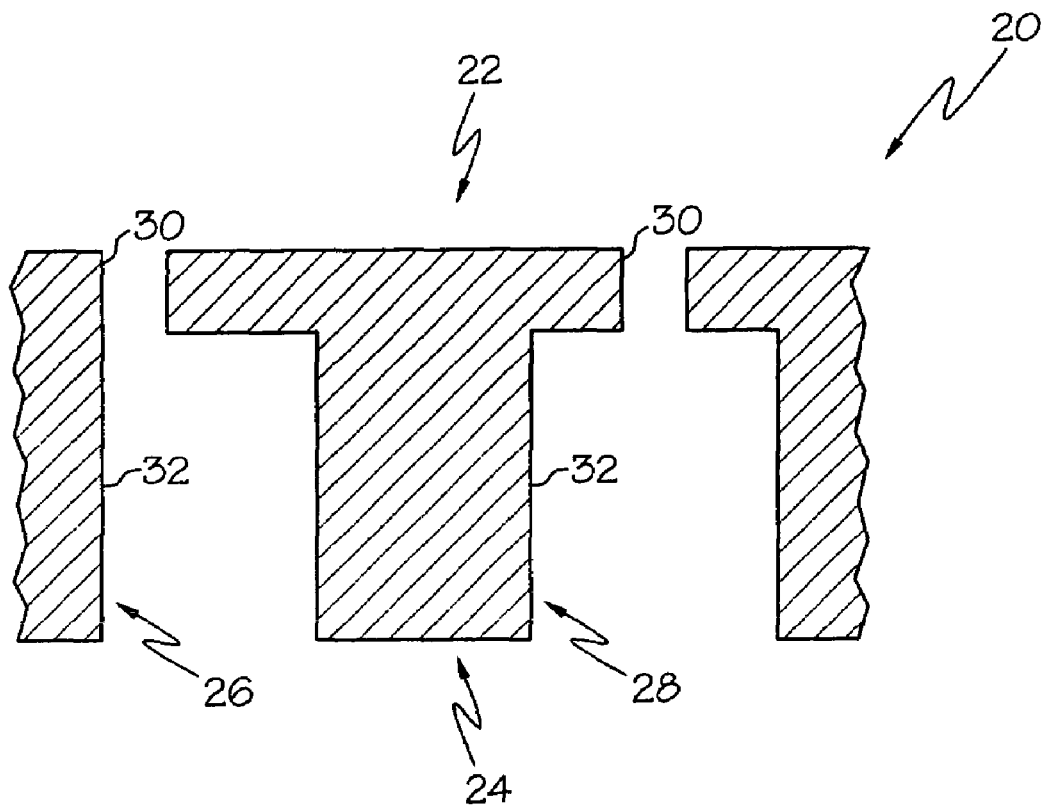
FIG. 1 is a schematic side view representation through a portion of a semiconductor substrate for use with an ink jet printhead in accordance with an exemplary embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE EXEMPLARY EMBODIMENTS

Reference will now be made in detail to various embodiments of the invention, examples of which are illustrated in the accompanying drawings, wherein like numerals indicate similar elements throughout the views.

With reference to FIG. 1, there is shown a schematic representation of a portion of a semiconductor substrate 20 for use with an ink jet printhead having first and second sides 22 and 24. In one embodiment, the semiconductor substrate 20 may be a silicon semiconductor substrate, relatively small in size and typically having overall dimensions ranging from about 2 to about 8 millimeters wide by about 10 to about 20 millimeters long and from about 0.4 to about 0.8 mm thick. As illustrated, semiconductor substrate 20 may comprise a first and second fluid channel 26 and 28 etched therein for controlling the flow of fluid (e.g. ink) from the second or backside 24 of the semiconductor substrate 20 to the first or device side 22 of the semiconductor substrate 20. As used herein, "channel" can include an individual slot or via, or the combination of a trench and slot.

Although not shown, the semiconductor substrate 20 may comprise a plurality of ink ejection devices such as piezoelectric devices or heater resistors formed on a device side 22 thereof. Upon activation of heater resistors, ink supplied through first and second fluid channels 26 and 28 in the semiconductor substrate 20 is caused to be ejected toward a print media through nozzle holes in a nozzle plate (not shown) located on the device side 22 of the semiconductor substrate 20. Ink ejection devices such as heater resistors and nozzle plates are formed on the device side 22 of the semiconductor substrate 20 by well known semiconductor manufacturing techniques.

First and second fluid channels 26 and 28 may each comprise a device channel 30 and a backside channel 32, each separately formed to be integral with one another. As illustrated, device channel 30 has a substantially smaller dimension than backside channel 32. Such geometry has many advantages. For example, because the device channel 30 is narrow, at least compared with the backside channel 32, more surface area on the device side 22 is available so that other components of the printhead (discussed above) can be secured to the device side 22 of the semiconductor substrate 20. In addition, because the backside channel is wide, at least compared with the device channel 30, flow of fluid can be controlled in a desired manner to the device side 22 of the semiconductor substrate 20, and ultimately, the print media. Of course, the geometry of the fluid channels, and specifically the device channel 30 and the backside channel 32, may comprise a number of other arrangements configured to manipulate the flow characteristics of fluid through the semiconductor substrate 20 while providing sufficient surface area on the device side 22 of the semiconductor substrate 20 for securing components of the printhead thereto.

Figure 2:
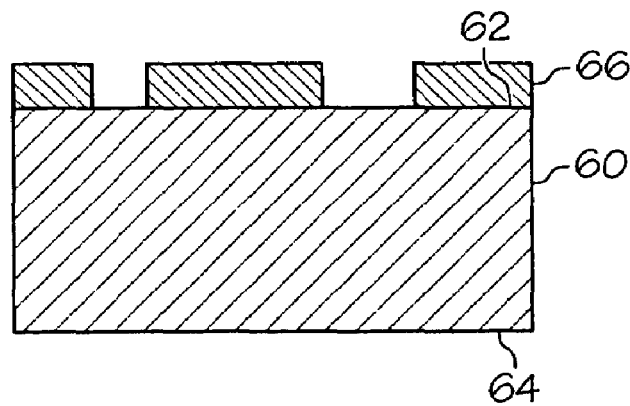
FIGS. 2-5 are schematic representations of a conventional multi-step etch process for preparing a semiconductor substrate for use in an ink jet printhead.
Figure 3:
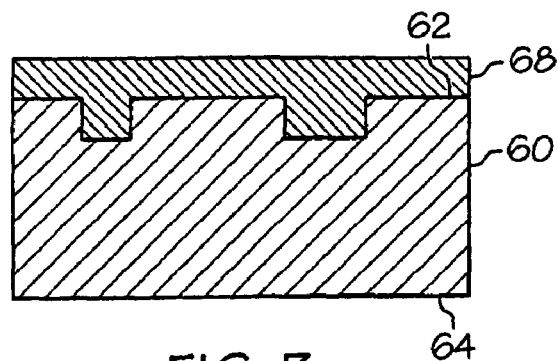
Figure 5:
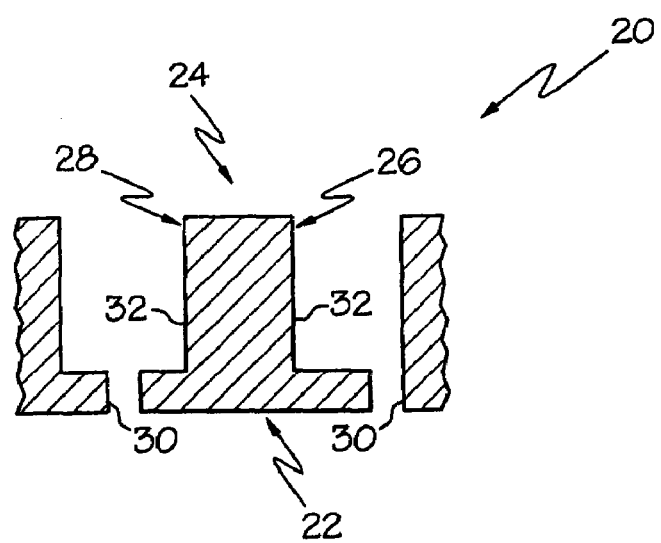
Figure 4A:
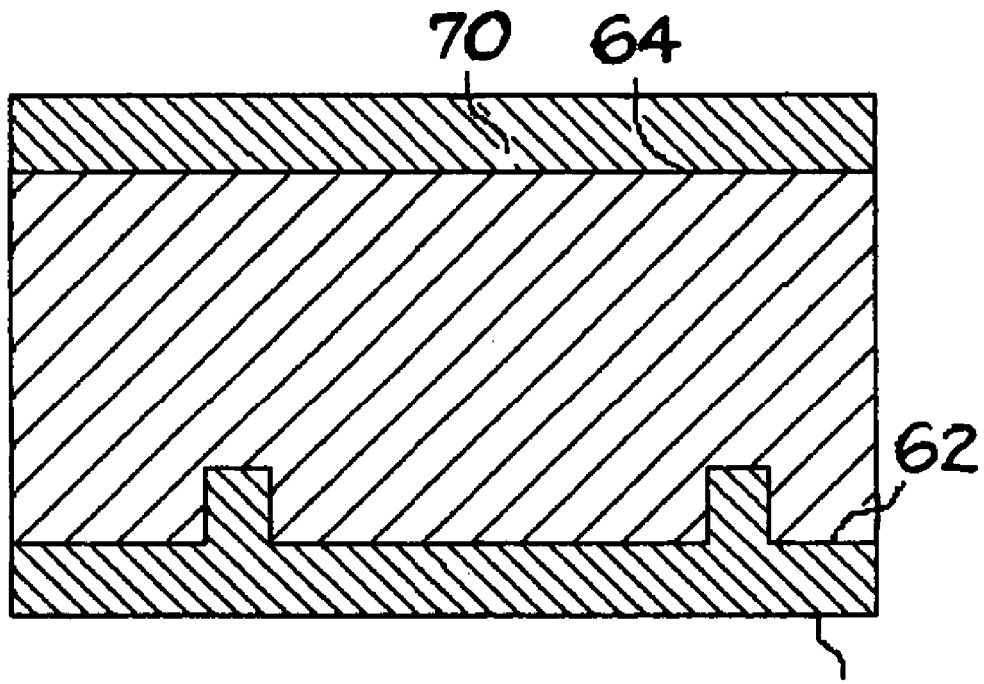
Figure 4B:
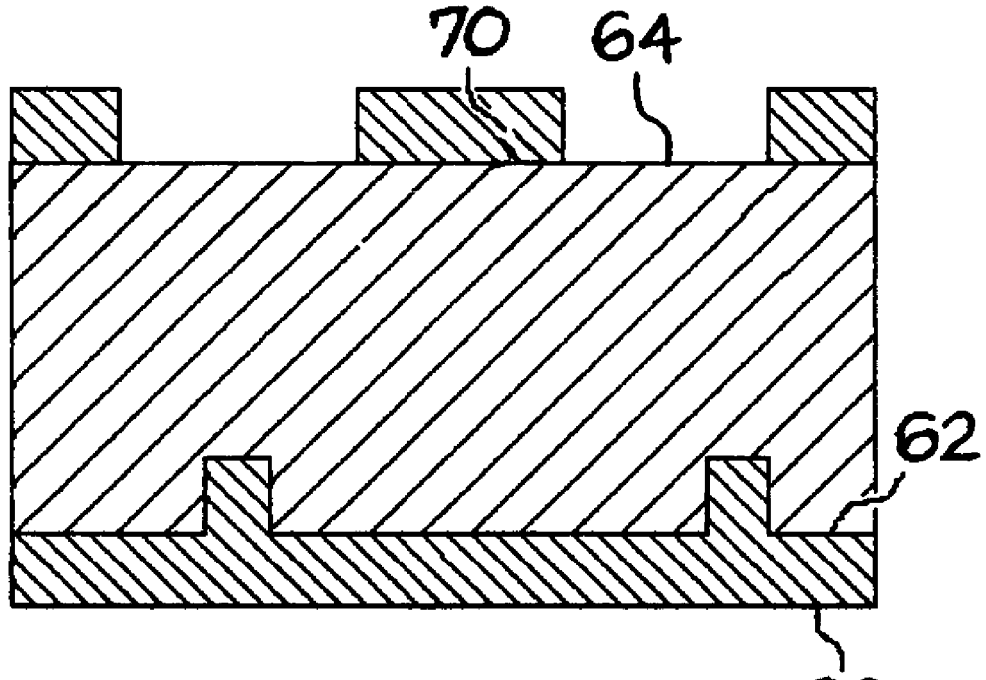

As previously discussed, specific geometric fluid channels, such as those illustrated in FIG. 1, are important attributes to ink jet printing quality. For example, because different systems and inks require unique fluid channel dimensions and shapes, the ability to form desired fluid channels in an efficient manner is key. Conventionally, fluid channels, such as that shown in FIG. 1, are formed through a multi-step method including sequentially etching the device and backsides 22 and 24 of the semiconductor substrate 20 to form an integral fluid channel. This process, however, can require approximately twenty steps, not all discussed herein, including two separate etching steps. For example, referring to FIGS. 2-5, a conventional process for creating fluid channels generally includes providing a semiconductor substrate 60 including a device side 62 and a backside 64 having a photoresist 66 thereon (FIG. 2). The device side 62 and the photoresist 66 is plasma etched. A photo resist fill and seal 68 is then applied to the device side 62 to planarize and provide a sealing surface for backside 64 cooling, as well as to act as an etch stop in the second subsequent etch step to follow (FIG. 3). A photo resist 70 may the be applied to the backside 64 of the semiconductor substrate 60 (FIG. 4) and patterned as in FIG. 4B. The photo resist 70 and semiconductor substrate 60 may be plasma etched (e.g., the second etch). Finally, the fill and seal layer 68 and the etch mask 70 may be removed (FIG. 5) to create the semiconductor substrate 20 of FIG. 1. Accordingly, such conventional processes can be time consuming and inefficient.

Figure 6:
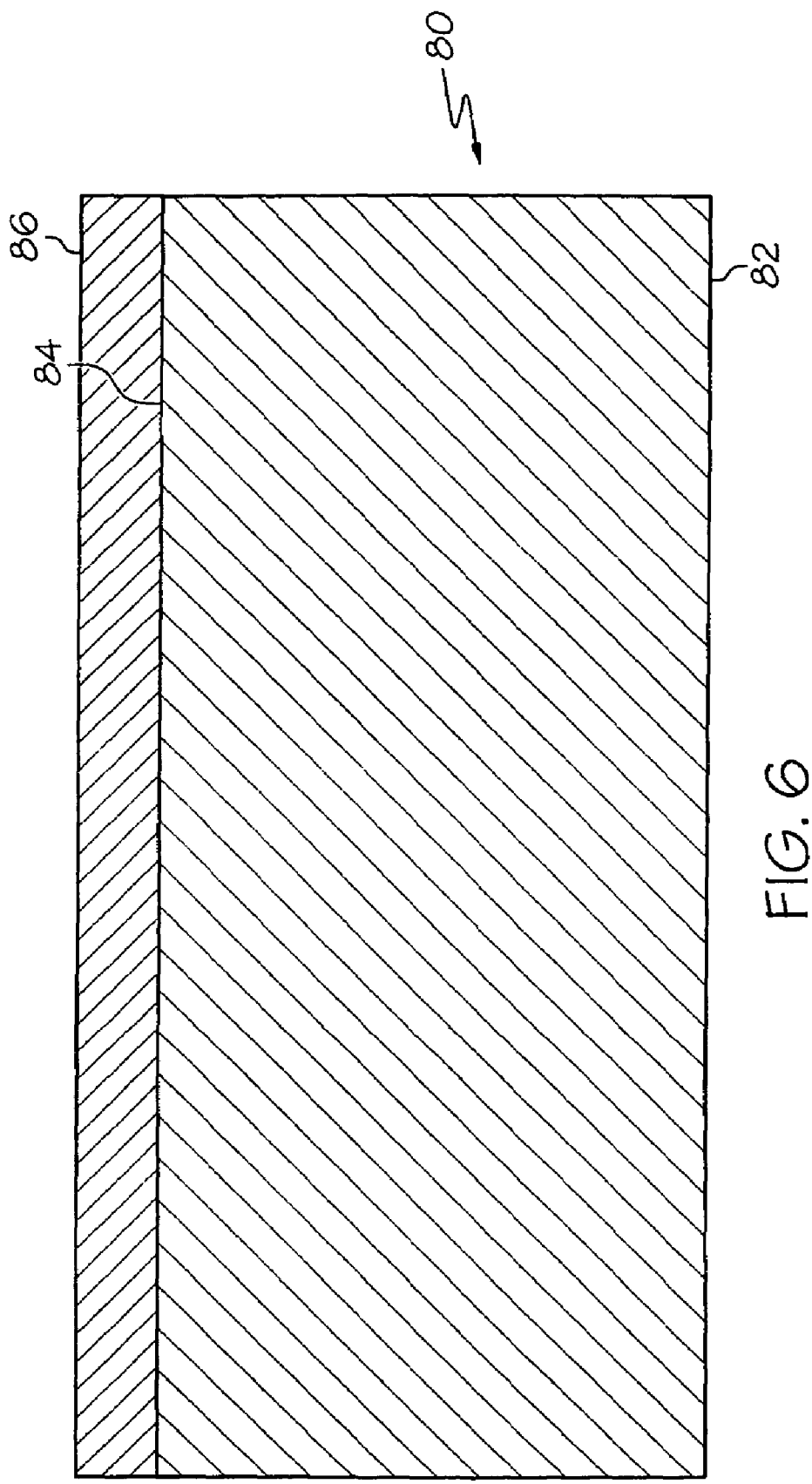
FIGS. 6-9 are schematic representations of a single-step etch process for preparing a semiconductor substrate for use in an ink jet printhead in accordance with one exemplary embodiment of the present invention.

It is one aspect of the present invention to improve the process of forming fluid channels by employing gray scale photo-lithographic techniques to strategically stagger the onset of etching between regions whose depth varying projections into the semiconductor substrate 80 will define fluid channel geometry. For example, referring to FIG. 6, a semiconductor substrate 80 may include a first side (e.g. device side 82) and a second side (e.g. backside 84). In one embodiment, a material layer 86 may be spin-coated onto the backside 84 of the semiconductor substrate 80. Such material layer may include, but is not limited to Novolac/DNQ photoresists such as the photoresist materials available from Clariant Corporation of Somerville, N.J. under the trade names AZ4620 and AZ1512, and from Shin Etsu MicroSci under the trade name FIPR7121. In the embodiments illustrated in FIGS. 6-15, a single positive photo resist layer may be utilized, however, it is contemplated that any number and types of layers may be utilized to provide a desired image for etching into the semiconductor substrate.

Figure 7:
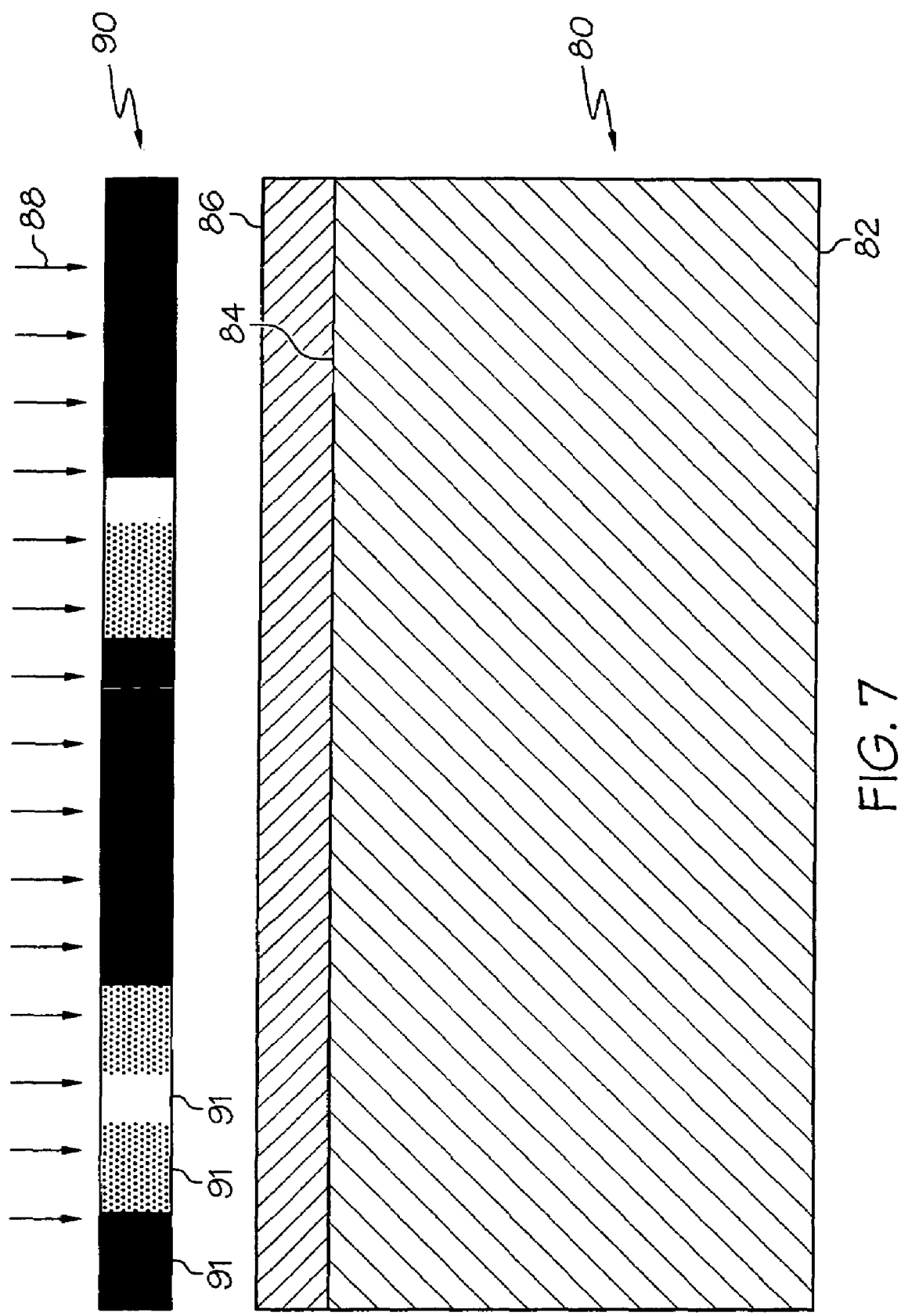
Figure 8:
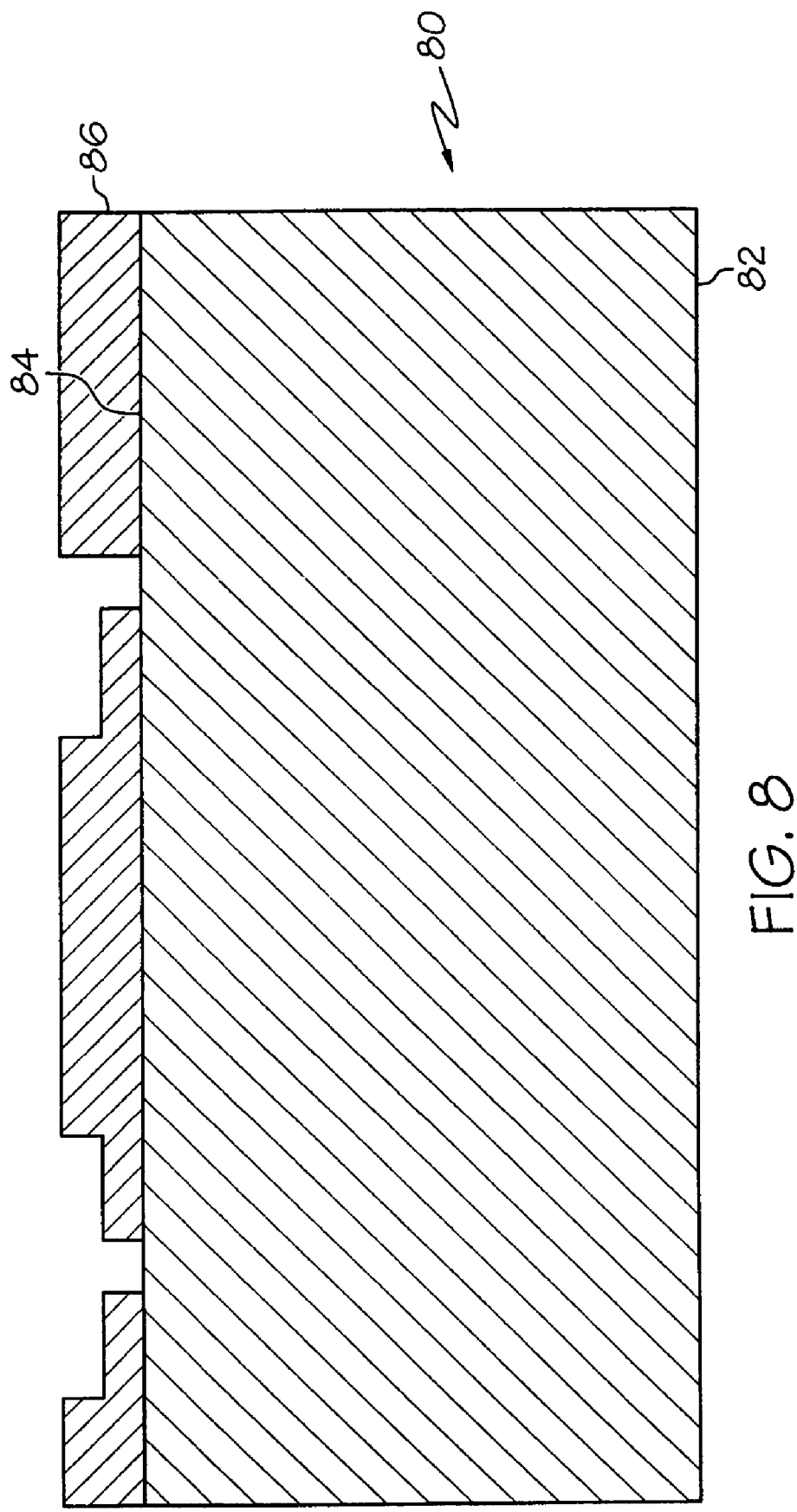

As illustrated in FIG. 7, ultraviolet (UV) radiation 88 may be applied to the material layer 86 on the backside of the semiconductor substrate 80 through a gray scale mask 90 corresponding to the desired geometry of a fluid channel within semiconductor substrate 80. More particularly, by manipulating both the chrome placement and surface area density or other optical transmission properties, the mask 90 itself, the geometry of the material layer 86, and ultimately the semiconductor substrate 80, may be manipulated. For example, referring to FIG. 8, once UV radiation is applied to the material polymer layer 86 through the mask 90, the material polymer layer 86 is modified to correspond to strategic pattern of light and shade in mask 90 of FIG. 7.

The pattern 91 of the mask 90 may be manipulated through strategic implementation of chrome placement and surface area density or other optical transmission properties (e.g., transmission elements) and arranged in a configuration corresponding to the desired fluid channel (e.g. FIG. 9) including any size, shape and number of slots. As discussed, the mask may be manipulated by appropriately shading the units of the gray scale mask to control the amount of UV radiation that can pass through, ultimately to the material layer. In addition, the pattern can be configured with a number of different shadings and/or shapes configured to correspond to a desired fluid channel, or more specifically, and individual slot or via.

Figure 18A:
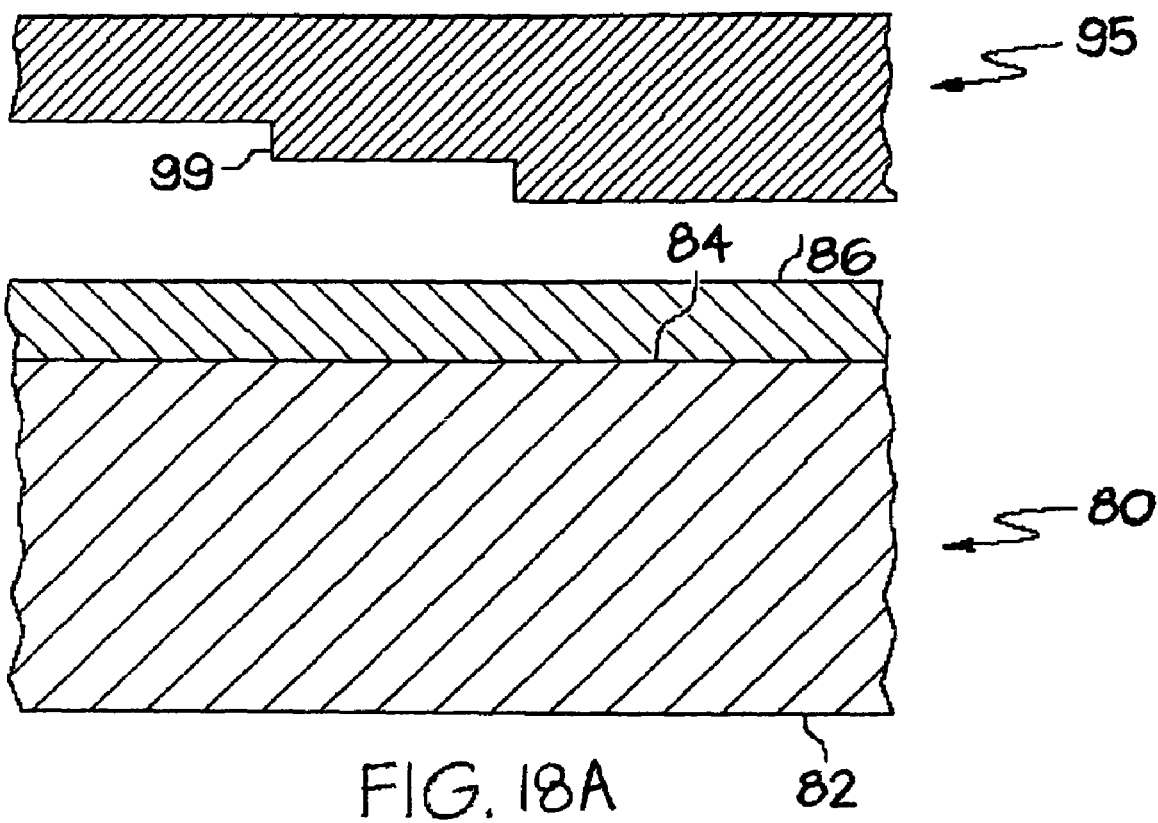
FIG. 18 is a schematic representation of a contact printing process in accordance with another exemplary embodiment of the present invention.
Figure 18B:
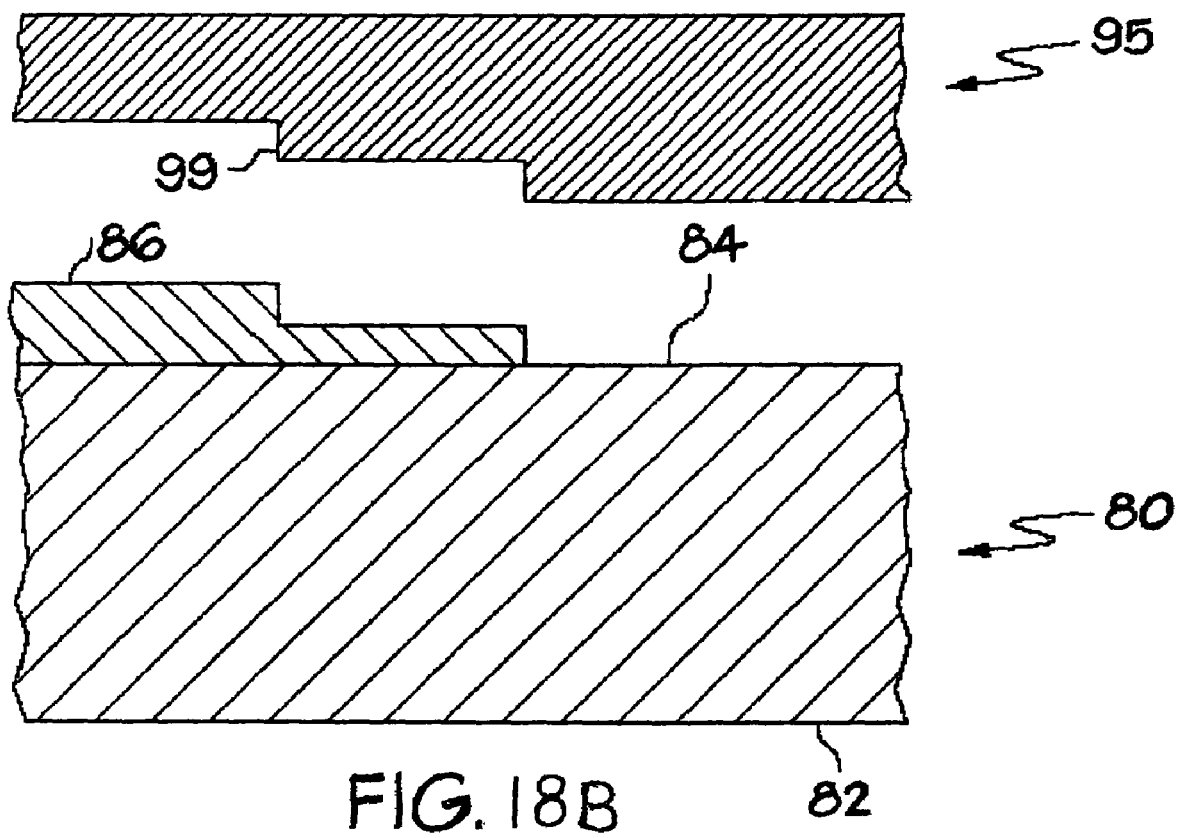

In addition, in another embodiment, a contact printing stamp may utilized as a patterning element to imprint the material layer acting as the etch mask. Referring to FIG. 18, contact printing utilizes a mold or "stamp" 95 pressed into the material layer 86, photo-sensitive or otherwise, to create surface topography. The geometry of the "stamp" 95 used in contact printing may be manipulated through strategic implementation of a template comprising at least one unit 99. Unit 99 and additional units if required may be arranged in a configuration corresponding to the negative image of the desired feature or features to be transferred, (e.g. FIG. 8) including any size, shape and number of slots, to the etch masking material referred to as imprint 93. As illustrated in FIG. 18A and FIG. 18B, unit 99 and at least a portion of the stamp may be configured so as to produce an offset fluid channel as discussed later herein. In addition, units that make up the stamp 95 can be configured with a number of different geometries configured to correspond to a geometry and ultimately, after etching, a fluid channel, or more specifically, any number of slots or vias. For example, in another embodiment, a plurality of units may be utilized to form one or more offset and/or symmetrical channels within the same semiconductor substrate. As used herein, a patterning element may be any device, substance or combination configured to manipulate the surface topography of a material layer or other layer associated with the substrate.

Figure 9:
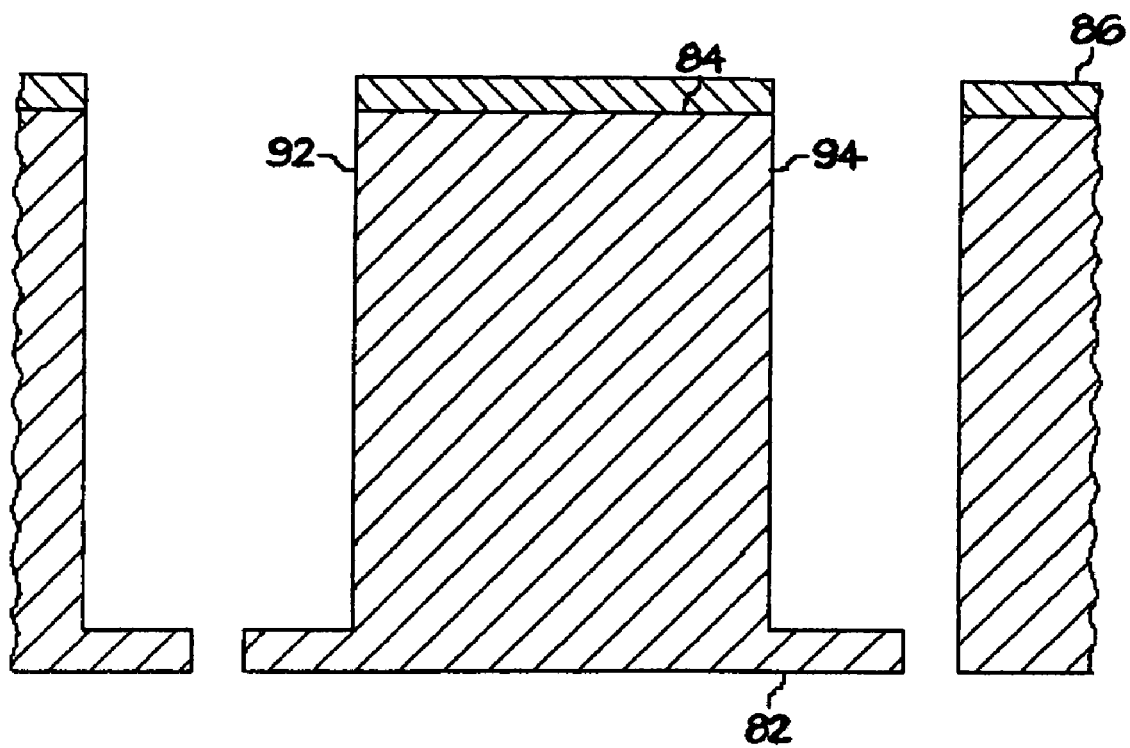

As regards the exemplary embodiment utilizing gray scale technology, once the UV light has created the desired image, or imprint, in the case of the embodiment regarding contact printing, into the material layer 86, the patterned material layer 86 and semiconductor substrate 80 may then be etched by, for example, reactive ion etching (RIE) or deep reactive ion etching (DRIE) to form fluid channels 92 and 94 or vias through the semiconductor substrate 80 from the first material layer 86 through the backside 84 to the device side 82 (e.g. FIG. 9). In order to form fluid channels 92 and 94, the semiconductor substrate 80 containing the patterned masking layer 86 is placed in an etch chamber having a source of plasma gas and back side cooling such as with helium, water or liquid nitrogen. The semiconductor substrate 80 may be maintained the below about 185° C., such as in a range of from about 50° to about 80° C. during the etching process. In the etching process, a deep reactive ion etch (DRIE) of the substrate is conducted using an etching plasma, as an example, derived from $SF_6$ and a passivating plasma derived from, as an example, $C_4F_8$ wherein the semiconductor substrate 80 is etched from the backside 84 toward the device side 82.

Figure 16:
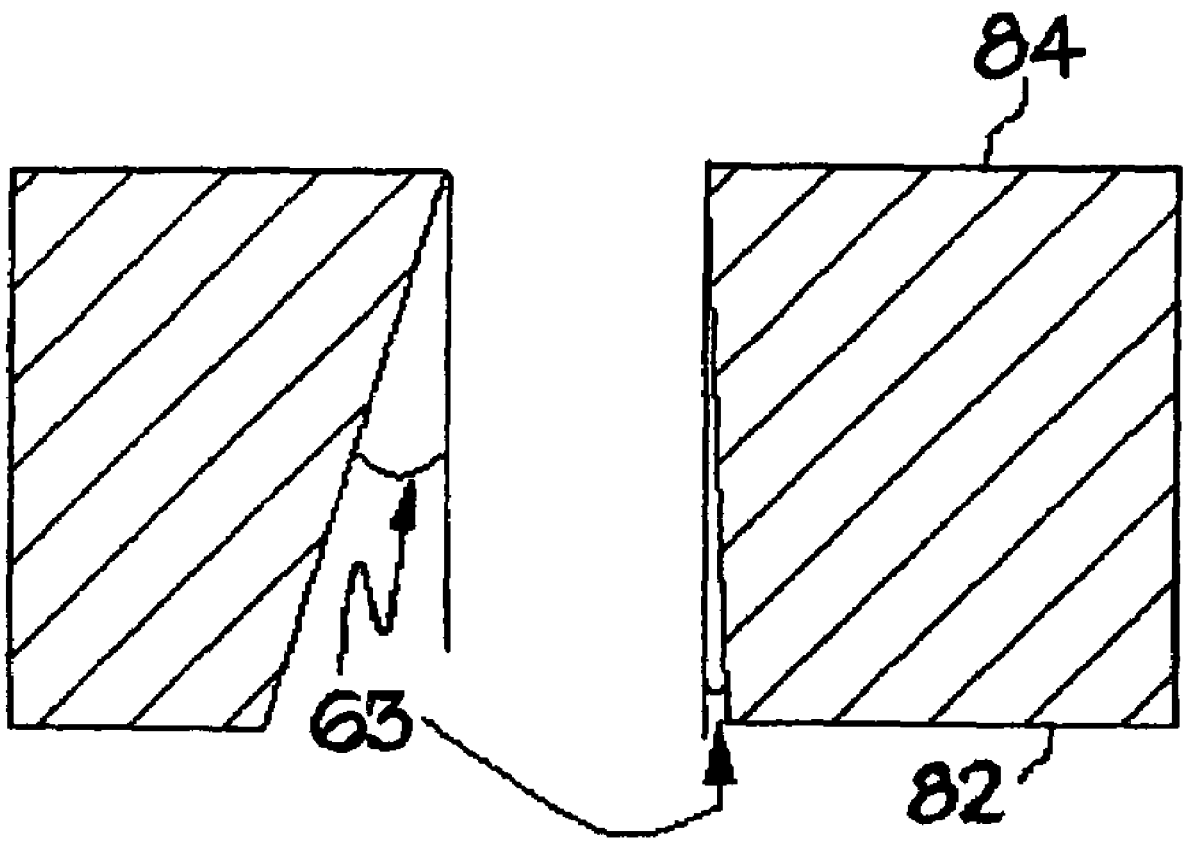
FIG. 16 is a schematic representation of a semiconductor substrate in accordance with an exemplary embodiment of the present invention.

During the etching process, the gas chemistry in the plasma chamber and the parameters defining the plasma characteristics are cycled between the passivating plasma step and the etching plasma step until the vias 92 and 94 are etched completely through the substrate 20 from the backside 84 to the device side 82. Exemplary cycling times for each step range from about 3 to about 20 seconds per step. Gas pressure in the etching chamber can range from about 15 to about 150 millitorr at a chuck temperature ranging from about −20° to about 35° C. In one exemplary embodiment, the DRIE platen power ranges from about 240 to about 290 watts and the coil power ranges from about 1500 watts to about 3.5 kilowatts at frequencies ranging from about 10 to about 15 MHz. Etch rates may range from about 2 to about 10 microns per minute or more and produce vias having side wall profile angles 63 in FIG. 16 ranging from about 2° to about 10° or more. Dry-etching apparatus suitable for forming fluid channels 92 and 94 are available from Surface Technology Systems, Ltd. of Gwent, Wales. Procedures and equipment for etching silicon are described in European Application No. 838,839A2 to Bhardwaj, et al., U.S. Pat. No. 6,051,503 to Bhardwaj, et al., PCT application WO 00/26956 to Bhardwaj, et al. Once the fluid channels 92 and 94 are etched in the semiconductor substrate 20, the material layer 86 may be removed from the substrate 20 by, for example, solvents. Of course, the etching parameters described herein may be varied.

As illustrated, the mask 90 of FIG. 7 may be configured so that the two fluid channels or more (e.g. 92 and 94 in FIG. 9) are formed and are similar to the fluid channels 26 and 28 in FIG. 1. However, the difference between the method discussed with regard to FIGS. 2-5 and the method discussed with regard to FIGS. 6-9 is that the latter method utilizes a single-step etch process to etch geometrically desired fluid channels 92 and 94 from the backside (e.g. opposite the device side) of the semiconductor substrate 20 through to the device side.

The exemplary one-step etch process described above provides a controllable path to etching fluid channels from the backside of the substrate 20 superior to conventional processes. For example, forming a reverse reentrant such as that illustrated in FIG. 17, specifically 396 in FIG. 17B, through the two-step process requires the etch rate at the top of a developing trench to exceed the etch rate at the bottom of the trench. This is usually accomplished in the Bosch process by, among other things, gradually increasing the passivation pressure/flow as the etch proceeds through the semiconductor substrate. However, excessive levels of passivation at the bottom of the trench that are not sufficiently removed in the following etch step continue to grow and produce what is often termed "micro-masking" which leads to the formation of structures with virtually no surface area and resulting in columnar, pointed structures (e.g. a phenomenon known as "grassing"). Grassing often creates a premature termination of the etch, and thus, an unsatisfactory substrate.

Figure 10:
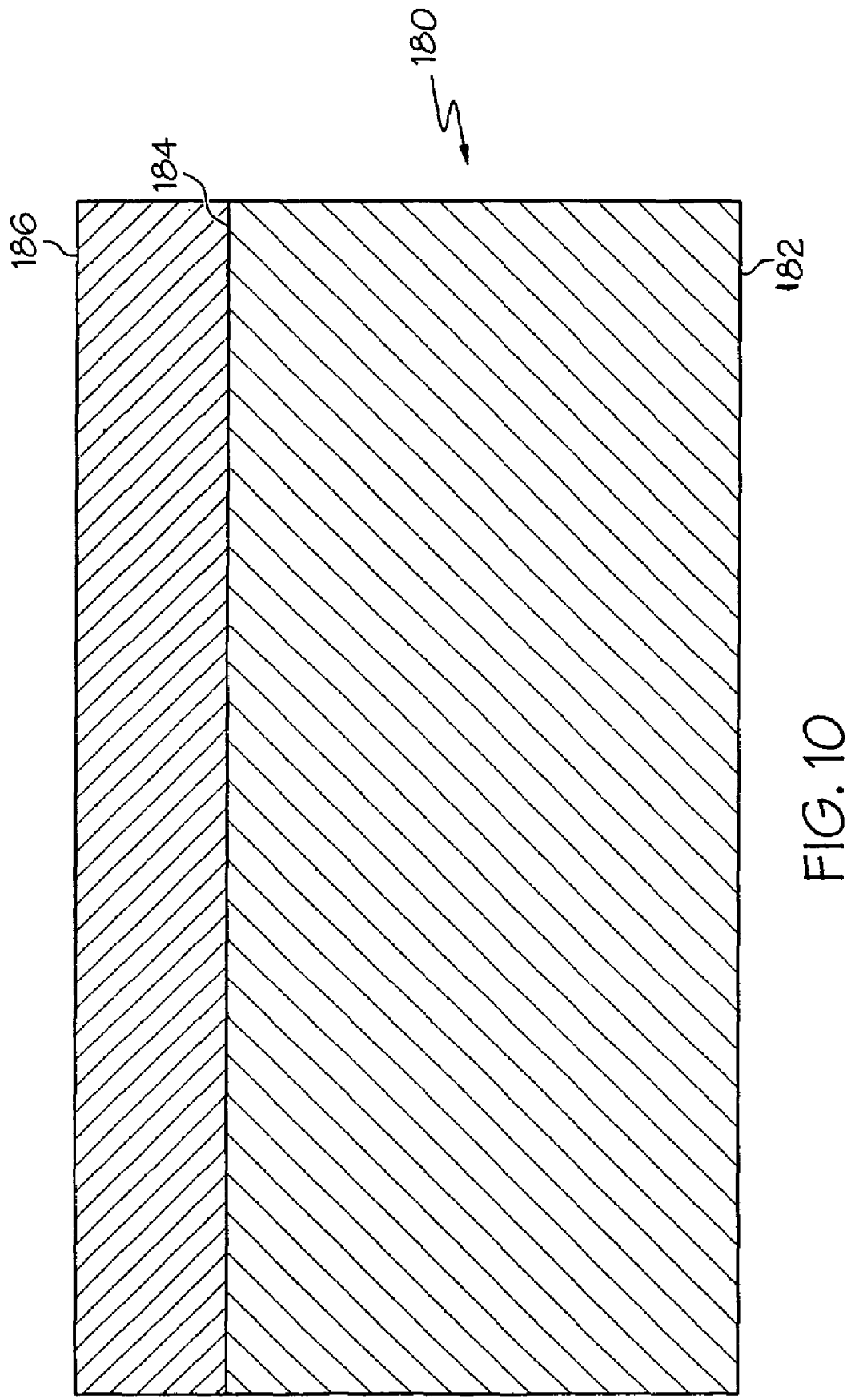
FIGS. 10-13 are schematic representations of a single-step etch process for preparing a semiconductor substrate for use in an ink jet printhead in accordance with another exemplary embodiment of the present invention.
Figure 11:
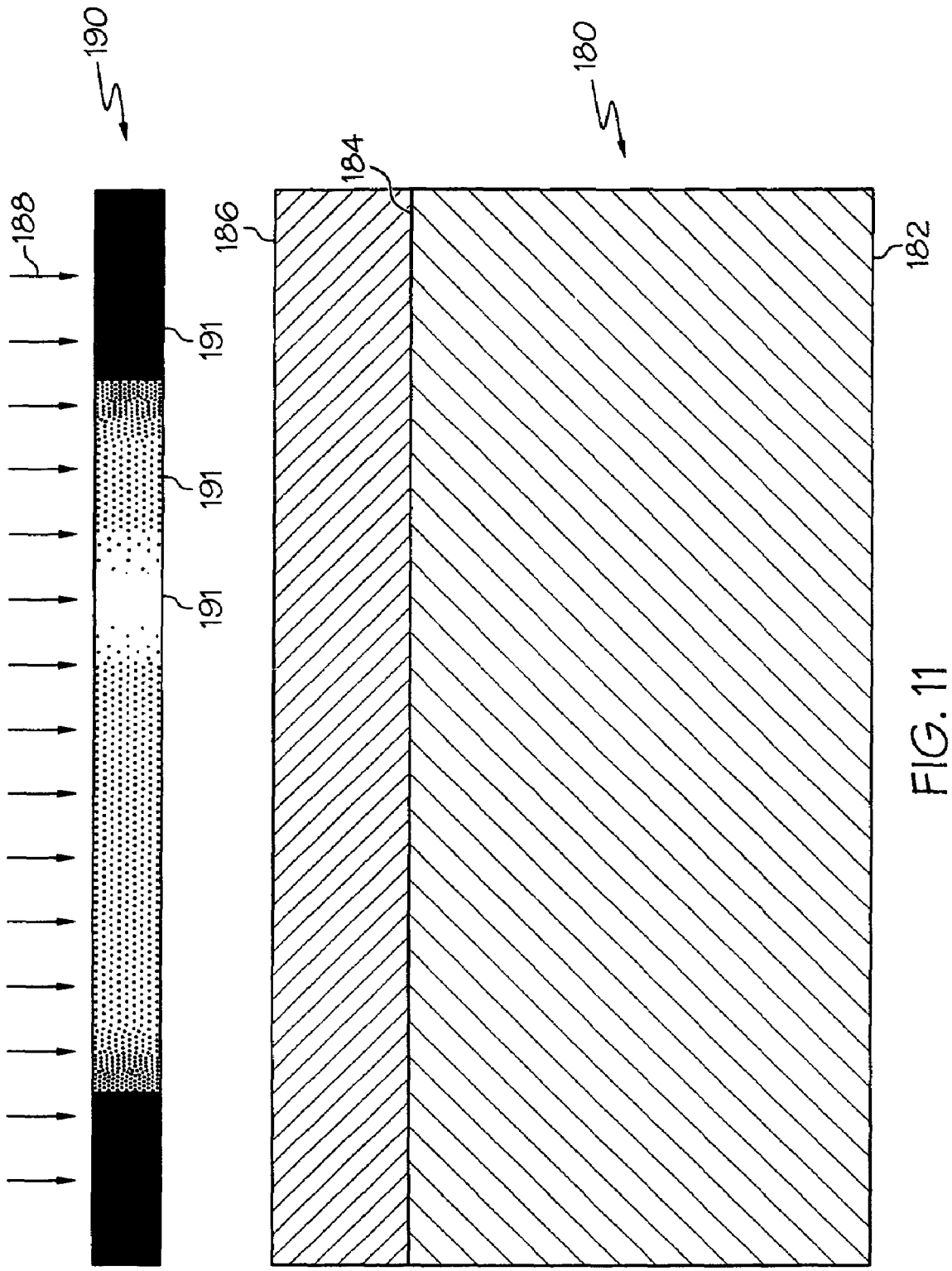
Figure 12:
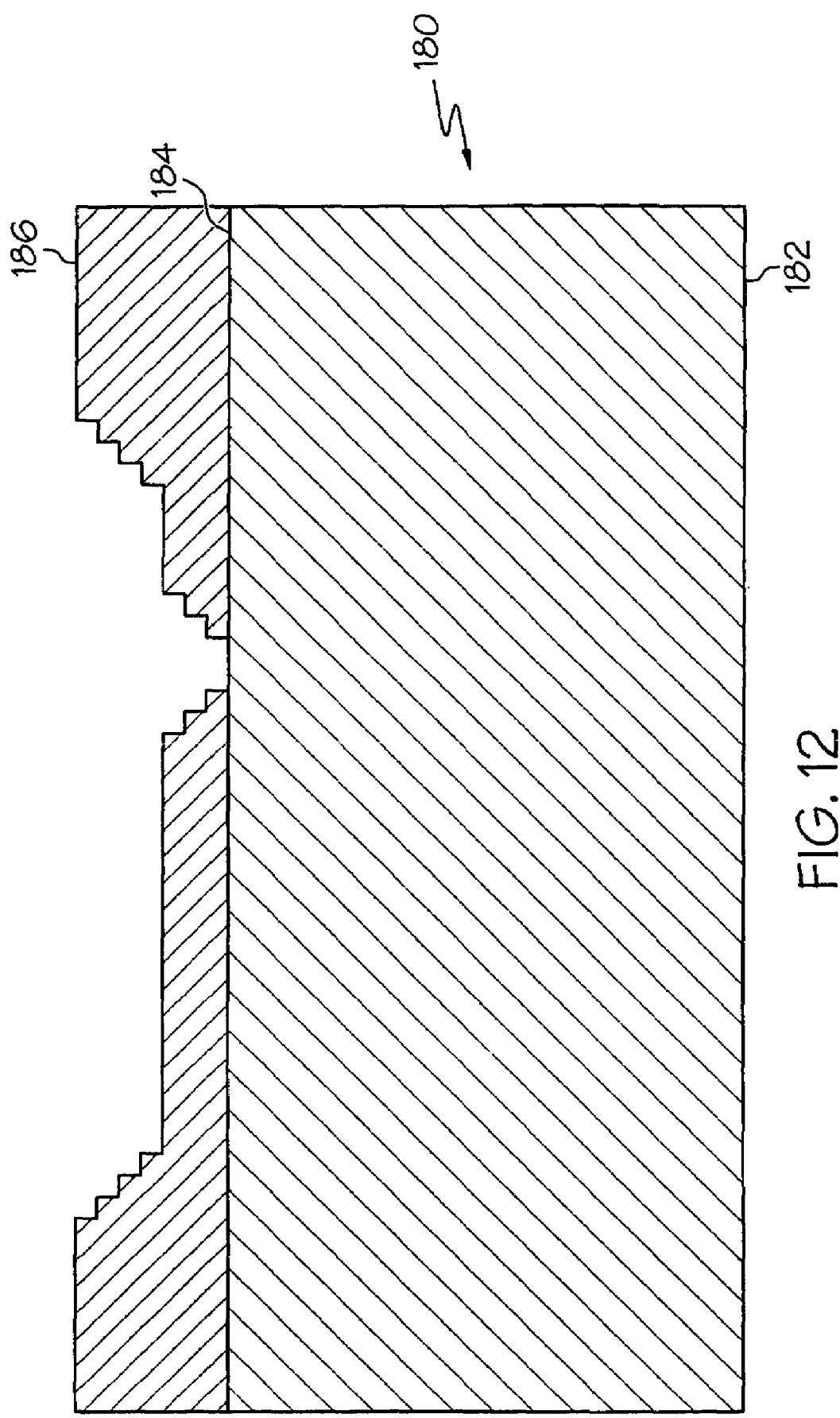
Figure 13:
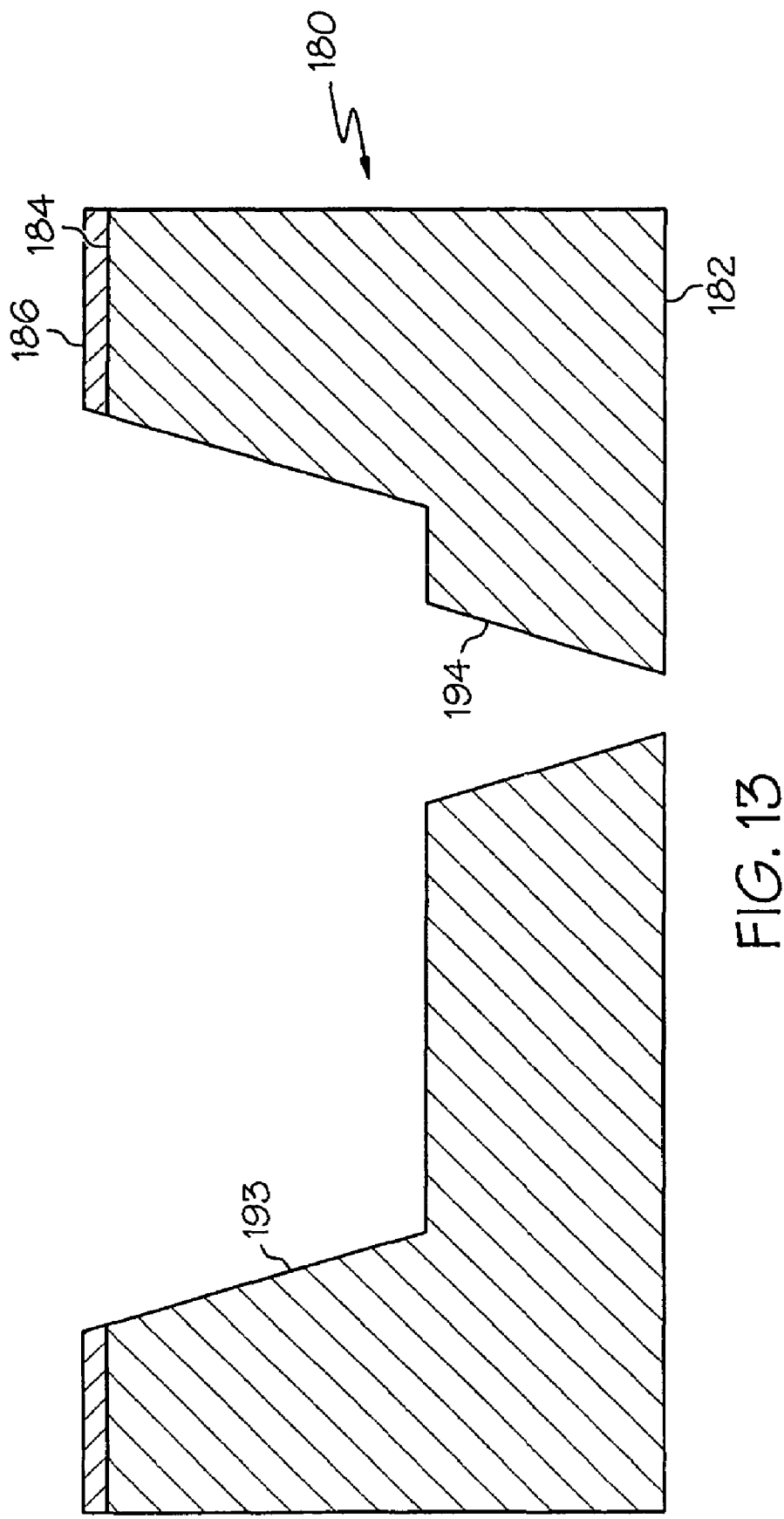
Figure 17A:
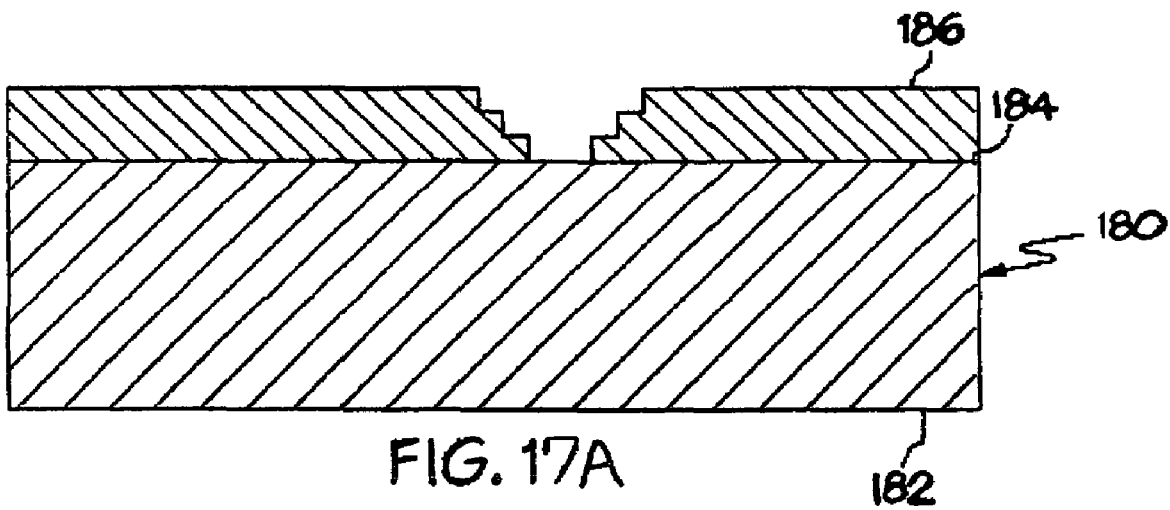
FIG. 17 are schematic representations of an etch process for preparing a semiconductor substrate in accordance with another exemplary embodiment of the present invention.
Figure 17B:
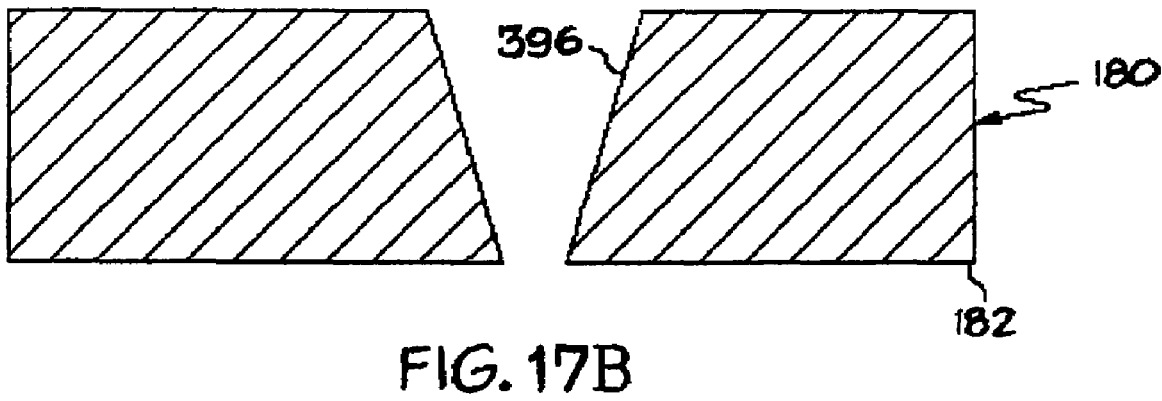

In contrast, the single-step process in accordance with the exemplary embodiments of the present invention utilizes an effective pattern (e.g. a mask corresponding to a fluid channel) to establish a controllable topography so as to properly guide the etch and allow a single etch step to produce profiles, as in FIG. 17, particularly 396 in FIG. 17B, throughout the semiconductor substrate, thus eliminating the issues with multiple steps and potential for grassing. The imprint or image on the material layer (or additional layers if desired) discussed herein can be affected by a number of controllable factors including the mask 90, and more specifically the transmission elements on making up the pattern 91 of the mask. For example, the pattern 91 of the mask may be individually formed to correspond to a desired fluid channel geometry. The ability to control the pattern of the mask can provide the precise formation of a desired fluid channel. In addition, as stated in a previous exemplary embodiment a surface topography may be formed using an imprint applied to a material layer, as previously described with respect to contact printing. Consequently, the exemplary processes described herein may be utilized to form fluid channels comprising a number of configurations. For example, referring to FIGS. 10-13, a semiconductor substrate 180 may include device side 182 and backside 184. In one embodiment, a material layer 186 (e.g. a positive photo resist layer) may be spin-coated onto the backside 184 of the semiconductor substrate 180. As illustrated in FIG. 10, ultraviolet (UV) radiation 188 may be applied to the material layer 186 on the backside of the semiconductor substrate 180 through a gray scale mask 190 configured with a pattern 191 corresponding to the desired geometry of the fluid channel within the semiconductor substrate 180. In this exemplary embodiment, it should be appreciated that pattern 191 of mask 190 is configured to form a single trench 193 with a fluid slot 194 therein (see FIG. 13)(e.g. the trench and via may be collectively referred to as the fluid channel). In addition, as illustrated in FIG. 13, fluid channel 194 may comprise a reentrant shape as viewed from the side opposite the side with the patterned material layer. In another embodiment, the pattern of the mask may be such to form an offset slot or via, if desired. As previously discussed, by manipulating the pattern of the mask 190, the geometry of the material layer 186, and ultimately the semiconductor substrate 180, may similarly be manipulated to form a specifically desired fluid channel. Referring to FIG. 11, once UV radiation is applied to the material layer 186 through the mask 190, the material layer 186 may reduce to the pattern of the mask 190 of FIG. 10. The material layer 186 and semiconductor substrate 180 may then be etched as previously discussed.

Figure 14:
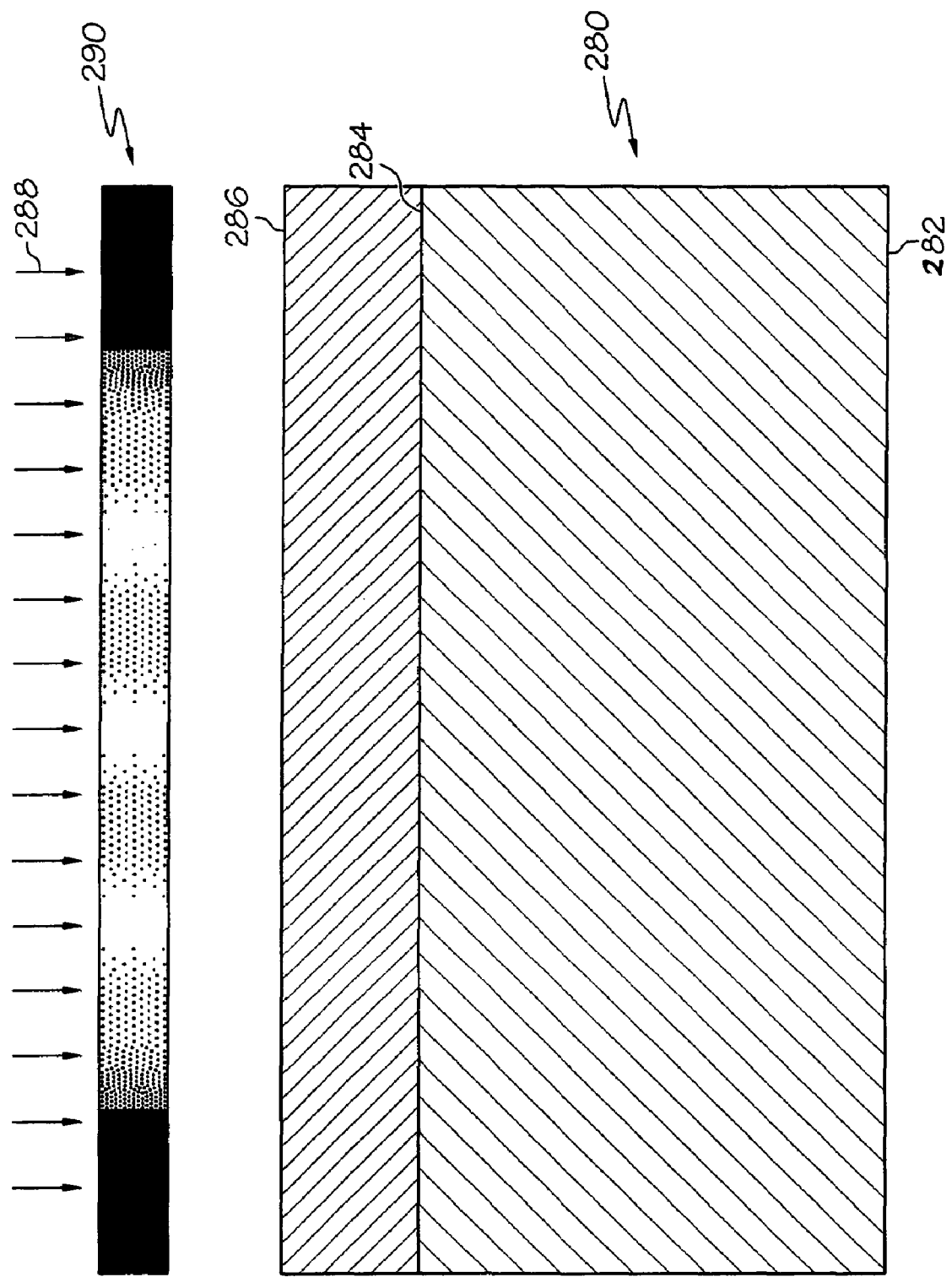
FIGS. 14-15 are schematic representations of a single-step etch process for preparing a semiconductor substrate for use in an ink jet printhead in accordance with another exemplary embodiment of the present invention.
Figure 15:
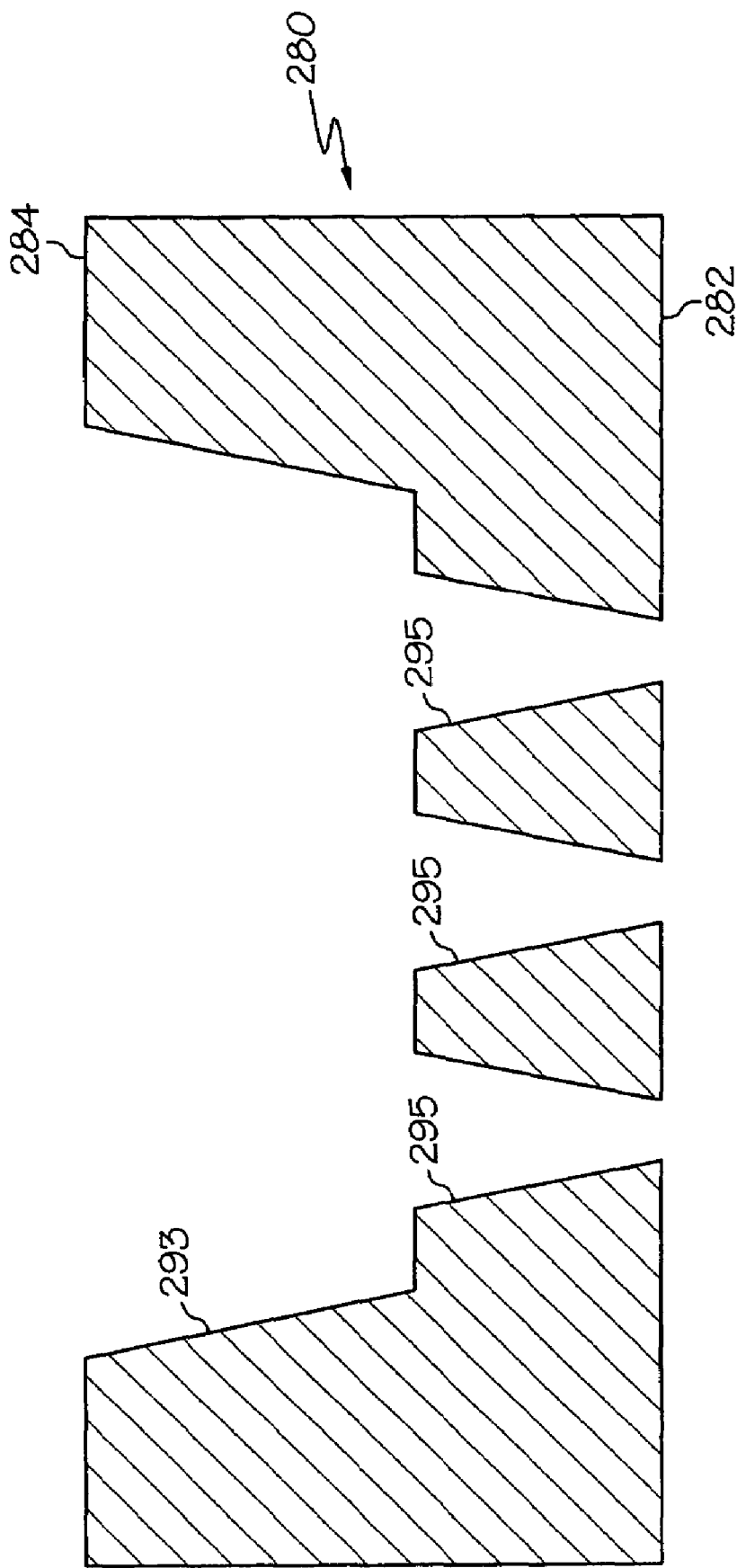

In yet another embodiment, the exemplary processes of the present invention may be utilized to form a fluid channel with a plurality of slots or a compound via in a semiconductor substrate. For example, referring to FIGS. 14-15, a semiconductor substrate 280 may include device side 282 and backside 284 and a material layer 286. As illustrated in FIG. 14, ultraviolet (UV) radiation 288 may be applied to the material layer 286 on the backside 284 of the semiconductor substrate 280 through a gray scale mask 290 configured with a pattern 291 corresponding to the desired geometry of the fluid channel within semiconductor substrate 280. In this exemplary embodiment, it should be appreciated that pattern 291 of mask 290 is configured to form a compound via (see 294 in FIG. 15) whereby more than one slot 295 is fed by a single trench 293. In addition, as illustrated in FIG. 15, each slot 295 may comprise a reentrant shape similar to FIG. 13. Of course, as previously discussed, each slot 295 may have an geometry distinct from the other slots by manipulating the pattern of the mask 290 accordingly. Referring to FIG. 15, and as previously discussed, the geometry of the semiconductor substrate 280 may take the shape of the mask 290. The material layer 286 and semiconductor substrate 280 may then be etched as previously discussed.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method of forming a fluid channel in a semiconductor substrate comprising:
    exposing a material layer applied to a side of a semiconductor substrate to sufficient light radiation energy through a gray scale mask configured with a pattern corresponding to a fluid channel; and
    etching said exposed material layer and said semiconductor substrate.

2. The method of forming a fluid channel as in claim 1, wherein the material layer is applied to a backside of said semiconductor substrate.

3. The method of forming a fluid channel as in claim 1, wherein the substrate is etched from a backside to a device side of the semiconductor substrate.

4. The method of forming a fluid channel as in claim 1, wherein said material layer comprises a positive resist layer.

5. The method of forming a fluid channel as in claim 1, wherein said material layer is spin-coated onto said semiconductor substrate.

6. The method of forming a fluid channel as in claim 1, wherein said pattern of said mask comprises transmission elements corresponding to said fluid channel.

7. The method of forming a fluid channel as in claim 1, further comprising forming an image in said material layer corresponding to a pattern of said gray scale mask.

8. The method of forming a fluid channel as in claim 7, wherein etching the material layer comprises dry-etching.

9. The method of forming a fluid channel as in claim 1, wherein etching said material layer comprises deep reactive ion etching.

10. The method of forming a fluid channel as in claim 1, further comprising removing said material layer from said semiconductor substrate.

11. The method of forming a fluid channel as in claim 1, wherein said gray scale mask is configured with a pattern corresponding to a fluid channel having a plurality of slots.

12. A method of forming a fluid channel in a semiconductor substrate comprising:
    applying a material layer to a backside of a semiconductor substrate;
    providing a gray scale mask configured with a pattern corresponding to a fluid channel having a plurality of slots;
    exposing said material layer to sufficient light radiation energy through said gray scale mask; and
    etching said exposed material layer and said semiconductor substrate through to a device side of said semiconductor substrate.

13. A method for forming a printhead for an ink jet printer, the method comprising:
    applying a material layer to a side of a semiconductor substrate;
    exposing said material layer to sufficient light radiation energy through a gray scale mask configured with a pattern corresponding to a fluid channel;
    etching said exposed material layer and said semiconductor substrate; and
    attaching said semiconductor substrate to a nozzle plate, an electrical circuit and a printhead body to form an ink jet printhead.

14. The method of forming a printhead as in claim 13, wherein the side comprises a backside of said semiconductor substrate.

15. The method of forming a printhead as in claim 13, wherein said pattern of said mask comprises a plurality of transmission elements corresponding to said fluid channel.

16. The method of forming a printhead as in claim 13, further comprising forming an image in said material layer corresponding to said pattern.

17. The method of forming a printhead as in claim 13, further comprising forming an imprint in the semiconductor substrate corresponding to said pattern.

18. A method of forming a fluid channel in a semiconductor substrate having a device side and a backside, the method comprising:
    etching an exposed material layer and the semiconductor substrate in a single step to form a fluid channel from the backside of the substrate wherein a resultant fluid channel has a reentrant profile with respect to a side opposite a side exposed to the etch.

19. The method of forming a fluid channel as in claim 18 wherein the material layer is exposed to a sufficient UV light radiation energy.

20. The method of forming a fluid channel as in claim 19 wherein the sufficient light radiation energy passes through a gray scale mask configured with a pattern corresponding to the fluid channel.

21. The method of forming a fluid channel as in claim 18 wherein the fluid channel further comprises a slot defined by the reentrant profile.

22. The method of forming a fluid channel as in claim 18 wherein the fluid channel further comprises a trench that feeds ink to the slot defined by the reentrant profile.

23. The method of forming a fluid channel as in claim 18 wherein the fluid channel further comprises a trench that feeds ink to a plurality of slots, each of the slot defined by the reentrant profile.

24. A method of forming a fluid channel in a semiconductor substrate having a device side and a backside, the method comprising:
   in a single etching step, etching a fluid channel from the backside of the substrate, wherein the fluid channel comprises a backside fluid channel and a device side fluid channel, and a profile of the backside fluid channel is different than a profile of the device side fluid channel, and wherein the device side fluid channel is offset with respect to the backside fluid channel.

25. The method of forming a fluid channel as in claim 24, wherein a size of the device side fluid channel is different from a size of the backside fluid channel.

26. The method of forming a fluid channel as in claim 24 wherein the device side fluid channel comprises a plurality of device side fluid channels.

27. A method of forming a fluid channel in a semiconductor substrate comprising:
   etching a semiconductor substrate and a material layer applied to the semiconductor substrate, wherein a geometry of the material layer has been manipulated to manipulate a rate of the etching.

28. The method of forming a fluid channel as in claim 27 wherein the geometry of the material layer is manipulated to stagger an onset of the etching in different regions of the semiconductor substrate.

29. The method of forming a fluid channel as in claim 27 wherein the geometry of the material layer is manipulated by exposing the material layer to sufficient light radiation energy through a gray scale mask.

30. The method of forming a fluid channel as in claim 27 wherein the geometry of the material layer is manipulated by contact printing the material layer with a stamp.

31. The method of forming a fluid channel as in claim 27 wherein the material layer is applied to a backside of the semiconductor substrate, wherein the backside is opposite a device side of the semiconductor substrate.

* * * * *